United States Patent
Mikuriya (10) Patent No.: US 12,420,829 B2
(45) Date of Patent: Sep. 23, 2025

(54) CONTROL DEVICE OF VEHICLE, CONTROL METHOD, AND PROGRAM

(71) Applicant: Woven by Toyota, Inc., Toyota (JP)

(72) Inventor: Sho Mikuriya, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 362 days.

(21) Appl. No.: 17/652,042

(22) Filed: Feb. 22, 2022

(65) Prior Publication Data
US 2022/0266860 A1 Aug. 25, 2022

(30) Foreign Application Priority Data
Feb. 24, 2021 (JP) .................. 2021-027479

(51) Int. Cl.
*B60W 60/00* (2020.01)
*B60W 30/09* (2012.01)
*B60W 50/00* (2006.01)
*B60W 50/08* (2020.01)

(52) U.S. Cl.
CPC ........ *B60W 60/0011* (2020.02); *B60W 30/09* (2013.01); *B60W 50/0098* (2013.01); *B60W 50/085* (2013.01); *B60W 60/0018* (2020.02); *B60W 2050/0075* (2013.01); *B60W 2510/18* (2013.01); *B60W 2510/20* (2013.01)

(58) Field of Classification Search
None
See application file for complete search history.

(56) References Cited

U.S. PATENT DOCUMENTS

| 11,951,966 | B2 * | 4/2024 | Balogh | B60T 8/28 |
| 2005/0171669 | A1 * | 8/2005 | Sato | B60W 30/188 701/51 |
| 2006/0041343 | A1 * | 2/2006 | Zaremba | B60W 30/188 701/53 |
| 2008/0006469 | A1 * | 1/2008 | Sasaki | B62D 5/0481 180/428 |

(Continued)

FOREIGN PATENT DOCUMENTS

| CN | 104787035 A | 7/2015 |
| JP | 2015058752 A | 3/2015 |

(Continued)

*Primary Examiner* — James J Lee
*Assistant Examiner* — Melanie G Huber
(74) *Attorney, Agent, or Firm* — Dickinson Wright, PLLC (57) ABSTRACT

A control device of a vehicle includes a control target value setting part for setting the first reference value as the control target value when the control demand value is greater than or equal to a second reference value; and a demand signal output part for outputting a control demand signal including the set control target value to the equipment control device. The first reference value is a value wherein an equipment control device outputs a corresponding equipment control signal when the control demand signal including this value as the control target value is sent to the equipment control device. The second reference value is the smallest value among values wherein the equipment control device does not output a corresponding equipment control signal when the control demand signal including this value as the control target value is sent to the equipment control device.

5 Claims, 5 Drawing Sheets

(56) References Cited

U.S. PATENT DOCUMENTS

| | | | |
|---|---|---|---|
| 2010/0036558 A1* | 2/2010 | Murakami | B60W 30/188 |
| | | | 701/31.4 |
| 2014/0121930 A1* | 5/2014 | Allexi | B60W 30/06 |
| | | | 701/70 |
| 2015/0202964 A1* | 7/2015 | Nefcy | B60W 10/08 |
| | | | 701/70 |
| 2015/0258897 A1* | 9/2015 | Okada | B60L 3/0046 |
| | | | 318/376 |
| 2016/0272180 A1* | 9/2016 | Morimura | B60T 8/885 |
| 2017/0137034 A1* | 5/2017 | Yamaguchi | B60W 40/12 |
| 2019/0225077 A1* | 7/2019 | Brinkmann | F01P 7/12 |
| 2020/0062301 A1* | 2/2020 | Farrelly | B62D 5/0409 |
| 2020/0189610 A1 | 6/2020 | Sakai et al. | |
| 2021/0237719 A1* | 8/2021 | Chen | F02D 11/107 |

FOREIGN PATENT DOCUMENTS

| | | | |
|---|---|---|---|
| JP | 2020093700 A | 6/2020 | |
| JP | 2020100244 A | 7/2020 | |

\* cited by examiner

CONTROL DEVICE OF VEHICLE, CONTROL METHOD, AND PROGRAM

FIELD

The present disclosure relates to a control device of a vehicle, a control method, and a program.

BACKGROUND

Up until now, control devices have been developed for controlling the running state of a vehicle in accordance with a desired control target so as to assist driving of the vehicle by a driver or so as to make the vehicle autonomously run (JP 2020-100244 A1, JP 2020-93700 A1, and JP 2015-58752 A1).

SUMMARY

In this regard, equipment relating to running of the vehicle (for example, the brakes and steering device) are provided with equipment control devices for controlling the equipment. Therefore, a control device of a vehicle for controlling the running state of the vehicle outputs control demand signals including control target values of equipment demanded from the vehicle during automated driving control of the vehicle, to the equipment control devices of the different equipment. The equipment control devices of the different equipment output equipment control signals to the different equipment based on the received control demand signals. The different equipment operates in accordance with the equipment control signals.

In this regard, however, when a control target value included in a control demand signal received from a control device is a value outside a predetermined allowable range, the equipment control device sometimes will not output an equipment control signal corresponding to this control target value. Further, if a control device of a vehicle is changed or is later added, the control device of a vehicle will sometimes send, depending on the operating state of the vehicle, a control demand signal including a control target value outside this allowable range, to the equipment control device. If in this way the control device of a vehicle sends a control demand signal including a control target value outside this allowable range, the equipment controlled by the equipment control device receiving the control demand signal will not suitably operate.

Therefore, an object of the present disclosure is to provide a control device of a vehicle able to make equipment relating to running of the vehicle suitably operate.

The present invention has as its gist the following.

(1) A control device of a vehicle for outputting a control demand signal to an equipment control device for controlling equipment relating to running of the vehicle, the control device of a vehicle comprising:

a control target value setting part for setting a control demand value of equipment demanded from the vehicle in automated driving control of a vehicle as a control target value of equipment when the control demand value is less than or equal to a first reference value, and for setting the first reference value as the control target value when the control demand value is greater than or equal to a second reference value greater than the first reference value; and a demand signal output part for outputting a control demand signal including the set control target value to the equipment control device through a communication part, wherein the equipment control device is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, the first reference value is a value wherein the equipment control device outputs a corresponding equipment control signal when the control demand signal including this value as the control target value is sent from the demand signal output part to the equipment control device, and the second reference value is the smallest value among values wherein the equipment control device does not output a corresponding equipment control signal when the control demand signal including this value as the control target value is sent from the demand signal output part to the equipment control device.

(2) The control device of a vehicle according to above (1), wherein the first reference value is the greatest value among values wherein the equipment control device outputs a corresponding equipment control signal when the control demand signal including this value as the control target value is sent from the demand signal output part to the equipment control device.

(3) The control device of a vehicle according to above (1) or (2), wherein the demand signal output part revises a control target value included in a provisional control demand signal received through the communication part from a driver assistance control device for assisting driving of the vehicle by a driver to the control target value by which the control target value setting part sets, and outputs the control demand signal including the revised control target value to the equipment control device through the communication part.

(4) A control method of a vehicle for outputting a control demand signal to an equipment control device for controlling equipment relating to running of the vehicle, the control method of a vehicle comprising:

setting a control demand value of equipment demanded from the vehicle in automated driving control of a vehicle as a control target value of equipment when the control demand value is less than or equal to a first reference value, and setting the first reference value as the control target value when the control demand value is greater than or equal to a second reference value greater than the first reference value; and outputting a control demand signal including the set control target value to the equipment control device through a communication part, wherein the equipment control device is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, the first reference value is a value wherein the equipment control device outputs a corresponding equipment control signal when the control demand signal including this value as the control target value is sent from the demand signal output part to the equipment control device, and the second reference value is the smallest value among values wherein the equipment control device does not output a corresponding equipment control signal when the control demand signal including this value as the control target value is sent from the demand signal output part to the equipment control device.

(5) A program of a vehicle for causing output of a control demand signal to an equipment control device for controlling equipment relating to running of the vehicle, the program causing a computer to execute a process comprising:

setting a control demand value of equipment demanded from the vehicle in automated driving control of a vehicle as a control target value of equipment when the control demand value is less than or equal to a first reference value and set the first reference value as the control target value when the control demand value is greater than or equal to a second reference value greater than the first reference value; and outputting a control demand signal including the set control target value to the equipment control device through a communication part, wherein the equipment control device is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, the first reference value is a value wherein the equipment control device outputs a corresponding equipment control signal when the control demand signal including this value as the control target value is sent from the demand signal output part to the equipment control device, and the second reference value is the smallest value among values wherein the equipment control device does not output a corresponding equipment control signal when the control demand signal including this value as the control target value is sent from the demand signal output part to the equipment control device.

DESCRIPTION OF EMBODIMENTS

Below, referring to the drawings, embodiments will be explained in detail. Note that, in the following explanation, similar components will be assigned the same reference notations.

Configuration of Vehicle-Mounted Control System

First, referring to FIG. 1, the configuration of a vehicle-mounted control system 1 in which a control device of a vehicle 100 according to one embodiment is mounted, will be explained. The vehicle-mounted control system 1 is mounted in the vehicle 100 and controls the running of the vehicle 100.

Figure 1:
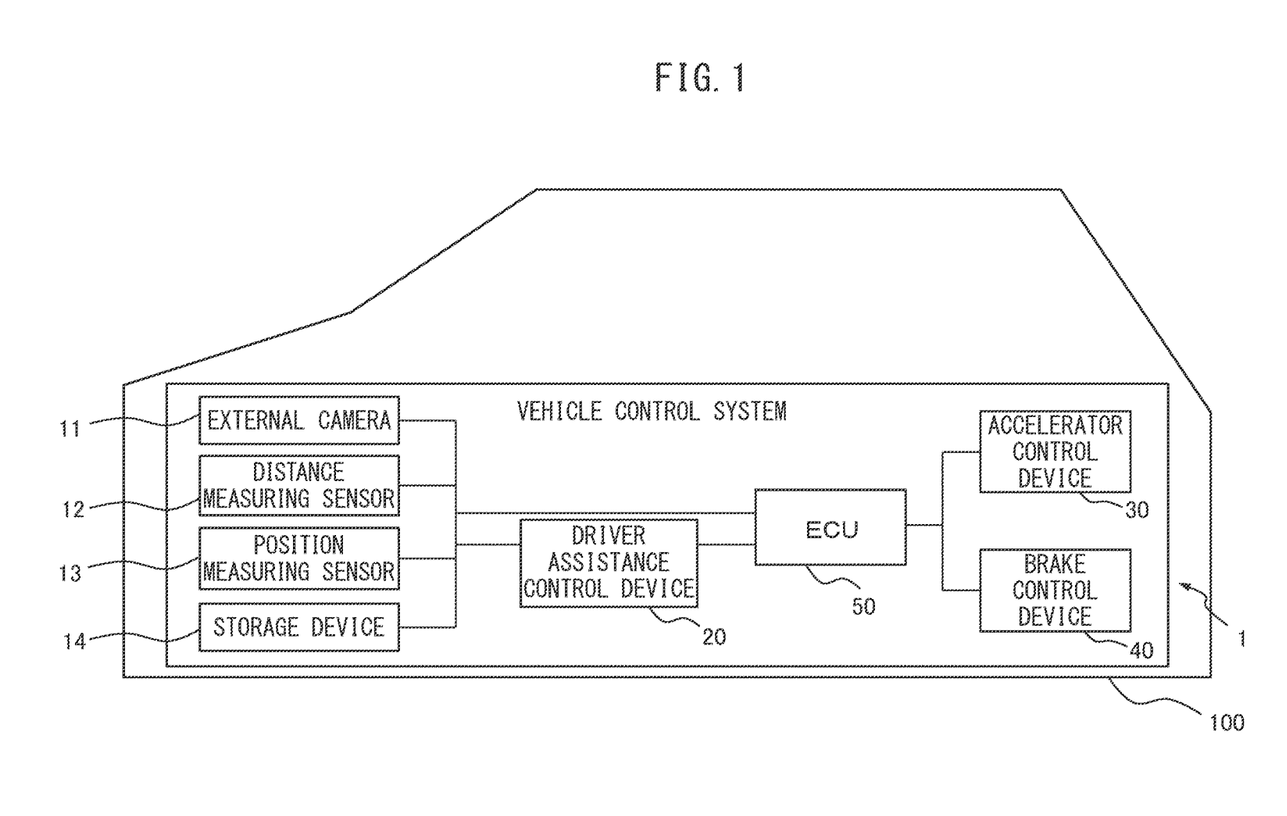
FIG. 1 is a schematic view of the configuration of a vehicle-mounted control system.

FIG. 1 is a schematic view of the configuration of the vehicle-mounted control system 1. As shown in FIG. 1, the vehicle-mounted control system 1 has information supplying equipment 11 to 14, a control device 20 for assisting operation of the vehicle by a driver (below, referred to as a "driver assistance control device"), an accelerator control device 30 which is one example of an equipment control device for controlling equipment relating to driving of the vehicle 100, a brake control device 40 which is another example of the equipment control device, and an electronic control device (ECU) 50 which is one example of a control device of the vehicle 100. The information supplying equipment 11 to 14, driver assistance control device 20, accelerator control device 30, brake control device 40, and ECU 50 are connected to be able to communicate with each other. In the present embodiment, the vehicle-mounted control system 1 has, as information supplying equipment, an external camera 11, distance measuring sensor 12, position measuring sensor 13, and storage device 14.

In the present embodiment, in the case of for example a vehicle 100 at which a driver assistance control device 20 is mounted, the ECU 50 is attached to the vehicle 100 later separate from the driver assistance control device 20. The ECU 50 utilizes the driver assistance control device 20 to control the vehicle for automated driving control. Further, some of the information supplying equipment 11 to 14 may be later attached to the vehicle 100 together with the ECU 50.

By later attaching the ECU 50 to the vehicle 100 in this way, the accelerator control device 30 and the brake control device 40 receive, as input, control demand signals output from the ECU 50, instead of control demand signals output from the driver assistance control device 20. The ECU 50 receives control demand signals (provisional control demand signals) including control target values (for example, target deceleration degree, target acceleration/deceleration degree, etc.) from the driver assistance control device 20 and, during the automated driving control of the vehicle 100, revises the control target values included in the control demand signals to the control target values demanded for the vehicle 100 in the automated driving control of the vehicle 100. Further, the ECU 50 outputs control demand signals including the revised control target values to the accelerator control device 30 and the brake control device 40. Therefore, the accelerator control device 30 and the brake control device 40 control the accelerator and brakes, based on the control target values contained in the control demand signals received from the ECU 50.

The external camera 11 is equipment capturing an image of the surroundings of the vehicle 100. The external camera 11 is, for example, attached to the inside of the vehicle 100 so as to face forward of the vehicle 100. The external camera 11 captures the region in front of the vehicle 100 and generates an image in which the front region is shown, every predetermined period. The external camera 11 outputs the generated image to the driver assistance control device 20 and ECU 50, every time it generates an image.

The distance measuring sensor 12 is a sensor for measuring the distance to an object present in the surroundings of the vehicle 100. The distance measuring sensor 12 is, for example, a lidar (LiDAR), milliwave radar or other radar, or sonar. In the present embodiment, the distance measuring sensor 12 outputs the result of measurement of the distance to an object in the surroundings, to the driver assistance control device 20 and ECU 50, every predetermined period.

The position measuring sensor 13 is a sensor for measuring the current position of the vehicle 100. The position measuring sensor 13 is, for example, a GPS (Global Positioning System) receiver. The GPS receiver receives GPS signals from a plurality of GPS satellites, and measures the current position of the vehicle 100 based on the received GPS signals. In the present embodiment, the position measuring sensor 13 outputs the measurement results of the current position of the vehicle 100, to the driver assistance control device 20 and ECU 50, every predetermined period.

The storage device 14 has, for example, a hard disk drive or a nonvolatile memory. The storage device 14 stores map information. The map information includes, for each predetermined section of a road, information showing the position of that section and road signs (for example, lane dividing lines or stop lines). The storage device 14 reads out map information in accordance with a map information readout demand from the driver assistance control device 20 or the ECU 50, and sends the map information to the driver assistance control device 20 or the ECU 50.

Note that, the vehicle-mounted control system 1 may, for example, have a navigation device for searching for a scheduled driving route of the vehicle 100, an HMI device for receiving input from a driver or passenger, a communication device with outside equipment, or other information supplying equipment other than the above equipment. These navigation device and HMI device also output data to the driver assistance control device 20 and ECU 50.

Further, in the present embodiment, all of the information supplying equipment 11 to 14 are connected to both the driver assistance control device 20 and ECU 50. However, part or all of these information supplying equipment 11 to 14 may be connected to the driver assistance control device 20, and another part or all of these information supplying equipment 11 to 14 may be connected to the ECU 50.

The driver assistance control device 20 controls the vehicle 100 for assisting driving of the vehicle 100 by the driver under predetermined circumstances. In the present embodiment, the driver assistance control device 20 sets at least the deceleration degree and acceleration/deceleration degree demanded from the vehicle 100 for assisting driving under predetermined circumstances. The predetermined circumstances are, for example, circumstances in which maintenance of a certain distance between another vehicle running in front of the vehicle 100 and the ego vehicle 100 is demanded, and the driver assistance control device 20 is a control device for active cruise control. Alternatively, the predetermined circumstances are parking of the vehicle 100, and the driver assistance control device 20 is a control device for automatic parking of the vehicle 100.

In the present embodiment, inside the passenger compartment of the vehicle 100, a switch is provided for setting whether to activate the driver assistance processing. The driver assistance control device 20 is set to operate through this switch. Alternatively, the driver assistance control device 20 is set by the ECU 50 so as to operate while the vehicle 100 is being controlled for automated driving.

While the vehicle 100 is being controlled for automated driving, the driver assistance control device 20 outputs, every predetermined period, a braking demand signal including a target deceleration degree of the vehicle 100 and an acceleration/deceleration demand signal including a target acceleration/deceleration degree (these together being referred to as a "control demand signals including control target values"). Note that, while the vehicle 100 is being controlled for automated driving, the target deceleration degree included in the braking demand signal which the driver assistance control device 20 outputs and the target acceleration/deceleration degree included in the acceleration/deceleration demand signal which the driver assistance control device 20 outputs are revised at the ECU 50, therefore these target deceleration degree and target acceleration/deceleration degree are not actually utilized for the automated driving control of the vehicle 100.

The accelerator control device 30 outputs an accelerator control signal to the accelerator of the vehicle 100 in accordance with the acceleration/deceleration demand signal received from the ECU 50 so that the acceleration/deceleration degree of the vehicle 100 approaches the target acceleration/deceleration degree contained in the acceleration/deceleration demand signal. In the present embodiment, while the vehicle 100 is being controlled for automated driving by the ECU 50, the accelerator control device 30 controls the accelerator of the vehicle 100 in accordance with the acceleration/deceleration demand signal received from the ECU 50.

For example, the accelerator control device 30 stores a reference table showing the correspondence between the target acceleration/deceleration degree and the accelerator opening degree, and refers to the reference table to determine the accelerator opening degree corresponding to the target acceleration/deceleration degree. Further, the accelerator control device 30 controls the accelerator so as to have the determined accelerator opening degree. The amount of fuel injection or the amount of intake air of the internal combustion engine of the vehicle 100 or the amount of supply of electric power to the drive use motor of the vehicle 100 are controlled in accordance with the thus controlled accelerator opening degree.

Further, when receiving an acceleration/deceleration demand signal including a target acceleration/deceleration degree satisfying a predetermined condition, the accelerator control device 30 outputs an accelerator control signal (equipment control signal) corresponding to this target acceleration/deceleration degree, to the accelerator. The accelerator control device 30 may also output the accelerator control signal to the ECU 50. On the other hand, when receiving an acceleration/deceleration demand signal including a target acceleration/deceleration degree not satisfying a predetermined condition, the accelerator control device 30 does not output an accelerator control signal corresponding to this target acceleration/deceleration degree, to the accelerator. Specifically, the accelerator control device 30 outputs a corresponding accelerator control signal to the accelerator, when receiving an acceleration/deceleration demand signal including a target acceleration/deceleration degree of less than or equal to an upper limit value which driver assistance control device 20 can output. On the other hand, the accelerator control device 30 does not output a corresponding accelerator control signal to the accelerator, but outputs a failure signal to the ECU 50, when receiving an acceleration/deceleration demand signal including a target acceleration/deceleration degree greater than the upper limit value.

The brake control device 40 outputs a brake control signal to the brakes of the vehicle 100 in accordance with a braking demand signal received from the ECU 50 so that the deceleration degree of the vehicle 100 approaches the target deceleration degree included in the braking demand signal. The brake control device 40 may also output the brake control signal to the ECU 50. In the present embodiment, while the vehicle 100 is being controlled for automated driving by the ECU 50, the brake control device 40 controls the brakes of the vehicle 100 in accordance with the braking demand signal received from the ECU 50.

For example, the brake control device 40 stores a reference table showing a correspondence between a target deceleration degree and a braking force, and refers to the reference table to thereby determine the braking force corresponding to the target deceleration degree. Further, the brake control device 40 controls the brakes so as to obtain the determined braking force.

Further, when receiving a braking demand signal including a target deceleration degree satisfying a predetermined condition, the brake control device 40 outputs a brake control signal (equipment control signal) corresponding to this target deceleration degree, to the brakes. On the other hand, when receiving a braking demand signal including a target deceleration degree not satisfying a predetermined condition, the brake control device 40 does not output a brake control signal corresponding to this target deceleration degree, to the brakes. Specifically, when receiving a braking demand signal including a target deceleration degree less than or equal to the upper limit value, the brake control device 40 outputs the corresponding brake control signal to the brakes. On the other hand, when receiving a braking demand signal including a target deceleration degree greater than the upper limit value, the brake control device 40 does not output the corresponding brake control signal to the brakes, but outputs a failure signal to the ECU 50.

Figure 2:
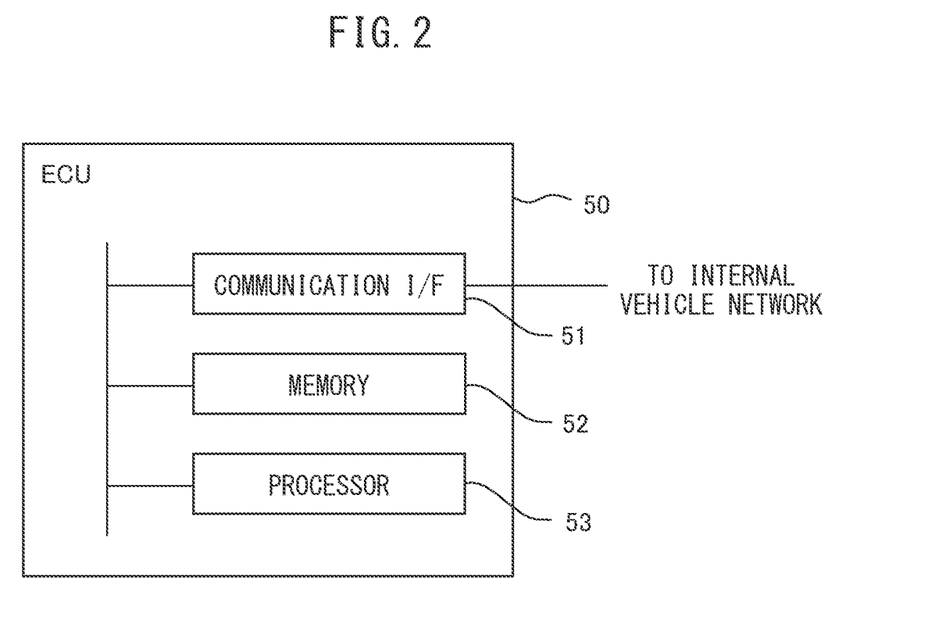
FIG. 2 is a view of a hardware configuration of an ECU.

FIG. 2 is a view of the hardware configuration of the ECU 50. The ECU 50 utilizes the driver assistance control device 20 to control the vehicle 100 for automated driving. For this reason, the ECU 50 has a communication interface 51, memory 52, and processor 53. Note that, the communication interface 51, memory 52, and processor 53 may be separate circuits or may be configured as a single integrated circuit.

The communication interface 51 is one example of a communication part and has an interface circuit for connecting the ECU 50 to the driver assistance control device 20, the accelerator control device 30, and the brake control device 40. Each time receiving an acceleration/deceleration demand signal and braking demand signal from the driver assistance control device 20, the communication interface 51 sends the received acceleration/deceleration demand signal and braking demand signal to the processor 53. Further, each time receiving a failure signal output from the accelerator control device 30 and the brake control device 40, the communication interface 51 sends the received failure signal to the processor 53. In addition, the communication interface 51 outputs the acceleration/deceleration demand signal to the accelerator control device 30, and outputs the braking demand signal to the brake control device 40.

Furthermore, the communication interface 51 sends to the processor 53 an image capturing the surroundings of the vehicle 100 received from the external camera 11, a distance measurement signal received from the distance measuring sensor 12, a position measurement signal received from the position measuring sensor 13, map information read from the storage device 14, or a scheduled driving route received from the navigation device, etc.

The memory 52 is a storage device for storing data. The memory 52, for example, has a volatile semiconductor memory and a nonvolatile semiconductor memory. The memory 52 stores programs for vehicle control processing performed by the processor 53 of the ECU 50. Further, the memory 52 stores images captured by the external camera 11, operating information by the driver, results of measurement of distance to objects in the surroundings of the vehicle, results of measurement of the current position, information entered by the driver or passengers, and various types of data used in the vehicle control processing, etc.

The processor 53 has one or more CPUs (central processing units) and their peripheral circuits. The processor 53 may further have other processing circuits such as a logic unit or arithmetic unit.

Vehicle Control Processing

The processor 53 of the ECU 50 performs vehicle control processing, while the vehicle 100 is being controlled for automated driving. Below, the vehicle control processing performed by the processor 53 will be explained.

Figure 3:
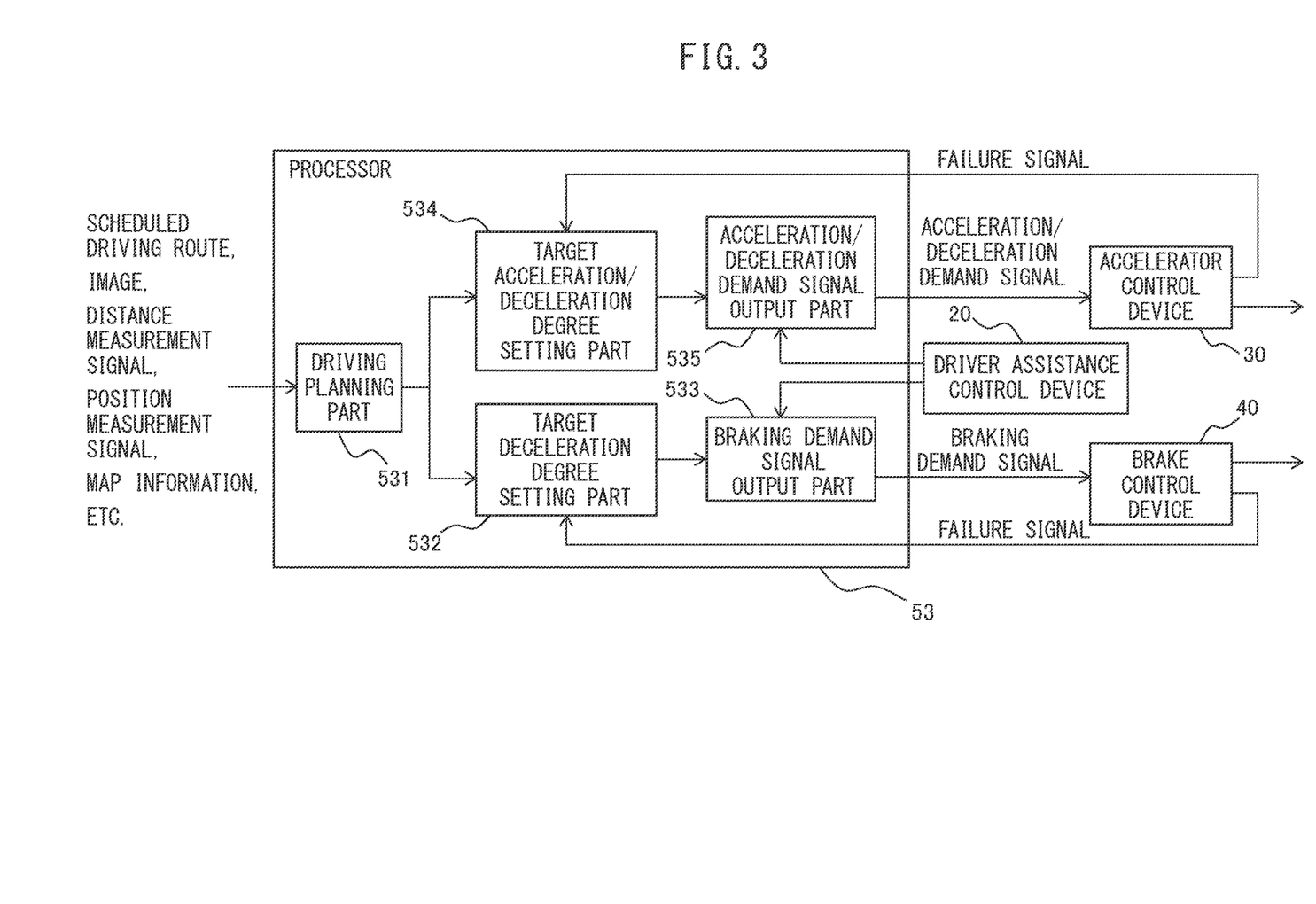
FIG. 3 is a functional block diagram relating to vehicle control processing.

FIG. 3 is a functional block diagram of the processor 53 relating to the vehicle control processing. The processor 53 has a driving planning part 531, target deceleration degree setting part 532, braking demand signal output part 533, target acceleration/deceleration degree setting part 534, and acceleration/deceleration demand signal output part 535. These parts of the processor 53 are, for example, functional modules realized by a computer program operating on the processor 53. Further, the parts of the processor 53 may also be mounted in the processor 53 as dedicated processing circuits.

The driving planning part 531 sets the scheduled path over which the vehicle 100 will run in a predetermined section from the current position of the vehicle 100 to a predetermined distance ahead (for example, 500 m to 1 km), while the vehicle 100 is being controlled for automated driving (below, referred to simply as the "scheduled driving path"). Further, the driving planning part 531 calculates the demanded deceleration degree and demanded acceleration/deceleration degree (control demand values) for the vehicle 100 to run along the scheduled driving path. The scheduled driving path is, for example, expressed as a set of positions of the vehicle 100 at different times when the vehicle 100 is running through a predetermined section.

The driving planning part 531 sets, for example, the scheduled driving path so as to follow a scheduled driving route. For example, the driving planning part 531 sets the scheduled driving path so that if there are no points for turning right and points for turning left on the scheduled driving route in the nearest predetermined section, the vehicle 100 runs along a lane currently being driven on. On the other hand, if there is a point for turning right or a point for turning left on the scheduled driving route in the nearest predetermined section, the driving planning part 531 sets the scheduled driving path so that the vehicle 100 can turn right or turn left at that point. At this time, if the vehicle 100 has to move to a target lane different from the lane on which the vehicle 100 is currently running in order for the vehicle 100 to turn right or turn left, the driving planning part 531 sets the scheduled driving path so that the vehicle 100 changes lanes to the target lane. Note that, the driving planning part 531, for example, compares ground objects shown in the image of the surroundings of the vehicle 100 obtained by a camera provided at the vehicle 100 against ground objects in the surroundings of the vehicle 100 shown in the map information to thereby identify the lane in which the vehicle 100 is currently running and the current position of the vehicle 100.

Furthermore, the driving planning part 531 sets the scheduled driving path so that the vehicle 100 does not collide with a physical object present in its surroundings (for example, another vehicle). For this reason, the driving planning part 531 acquires a series of images in time sequence in a nearest predetermined time period from the external camera 11 mounted in the vehicle 100. Further, the driving planning part 531 enters the acquired series of images into an identifier pretrained so as to detect physical objects in the surroundings of the vehicle 100 to thereby detect one or more physical objects present in the surroundings of the vehicle 100 from the images. Alternatively, the driving planning part 531 acquires a series of distance measurement signals in a nearest predetermined time period from the distance measuring sensor 12. Further, the driving planning part 531 enters the acquired series of distance measurement signals into an identifier pretrained so as to detect physical objects in the surroundings of the vehicle 100 to thereby detect one or more physical objects present in the surroundings of the vehicle 100 from the distance measurement signals.

The driving planning part 531 uses, as such an identifier, for example a so-called deep neural network (DNN) having a convolutional neural network (CNN) type architecture. Such an identifier uses large numbers of images in which physical objects to be detected are shown or distance measurement signals so as to pretrain it in accordance with a learning technique such as error back propagation.

The driving planning part 531 performs predetermined tracking processing on the individual physical objects detected from the images or the distance measurement signals to thereby track the physical objects, and find the paths of the physical objects in the nearest predetermined time period. For each physical object, it applies predetermined prediction processing on the found path to thereby estimate the predicted path which the physical object is envisioned as passing over. Further, the driving planning part 531 sets the scheduled driving path of the vehicle 100 based on the predicted paths of the physical objects being tracked so that for any physical object, the predicted value of the distance of the physical object being tracked until a predetermined time ahead and the vehicle 100 is greater than or equal to a predetermined distance.

Furthermore, the driving planning part 531 detects the colors of traffic lights positioned in the direction of advance of the vehicle 100 from the images obtained from the external camera 11. At that time, the driving planning part 531, for example, as explained above, enters the images into the identifier to thereby detect the colors of the traffic lights. Further, if the detected color of a traffic light is red, the driving planning part 531 sets the scheduled driving path so as to make the vehicle 100 decelerate and make the vehicle 100 temporarily stop at a stop position of an intersection where that traffic light is provided. On the other hand, the driving planning part 531 sets the scheduled driving path so that if the vehicle 100 is temporarily stopped at an intersection by a red light, the vehicle 100 starts and gradually accelerates when the color of the traffic light is detected as changing from red to green.

If setting the scheduled driving path, the driving planning part 531 determines for the demanded deceleration degree and demanded acceleration/deceleration degree so that the vehicle 100 will run along the scheduled driving path. That is, this demanded deceleration degree and demanded acceleration/deceleration degree are values demanded from the vehicle 100 if the vehicle 100 is being controlled for automated driving.

For example, every predetermined period, the driving planning part 531 calculates the demanded deceleration degree and demanded acceleration/deceleration degree of the vehicle 100 in accordance with the scheduled driving path, the current position of the vehicle 100, and the current speed of the vehicle 100 measured by a vehicle speed sensor (not shown). In particular, if making the vehicle 100 decelerate due to a demand in automated driving control, the driving planning part 531 makes the demanded acceleration/deceleration degree a value indicating deceleration, and calculates the demanded deceleration degree in accordance with the demanded acceleration/deceleration degree.

For example, the driving planning part 531 calculates the demanded deceleration degree and demanded acceleration/deceleration degree so that at the time of deceleration of the vehicle 100, the braking force able to be adjusted by the accelerator control device 30 (for example, the braking force by engine braking) and the braking force by the brakes are combined and the deceleration degree for the vehicle 100 to run along the scheduled driving path is achieved. In particular, the driving planning part 531 sets the demanded acceleration/deceleration degree so that the braking force able to be adjusted by the accelerator control device 30 is less than or equal to the upper limit value and sets the demanded deceleration degree so that the total of the set demanded acceleration/deceleration degree and demanded deceleration degree is the deceleration degree for the vehicle 100 to run along the scheduled driving path.

Each time calculating the demanded deceleration degree and demanded acceleration/deceleration degree, the driving planning part 531 sends the calculated demanded deceleration degree to the target deceleration degree setting part 532, and sends the calculated demanded acceleration/deceleration degree to the target acceleration/deceleration degree setting part 534.

The target deceleration degree setting part 532 sets the target deceleration degree to be included in the braking demand signal sent to the brake control device 40, while the vehicle 100 is being controlled for automated driving.

In this regard, as explained above, when receiving a braking demand signal (control demand signal) including a target deceleration degree (control target value) greater than an upper limit value, the brake control device 40 does not output the corresponding brake control signal to the brakes, but, in particular in the present embodiment, outputs a failure signal to the ECU 50. As a result, if large deceleration of the vehicle 100 is required, the vehicle 100 will not sufficiently decelerate or will not decelerate at all. Therefore, when a demanded deceleration degree so great that the brake control device 40 will output a failure signal is sent from the driving planning part 531, the target deceleration degree setting part 532 sets the target deceleration degree to a value by which the brake control device 40 will output a brake control signal corresponding to this target deceleration degree (value not outputting failure signal).

Figure 4:
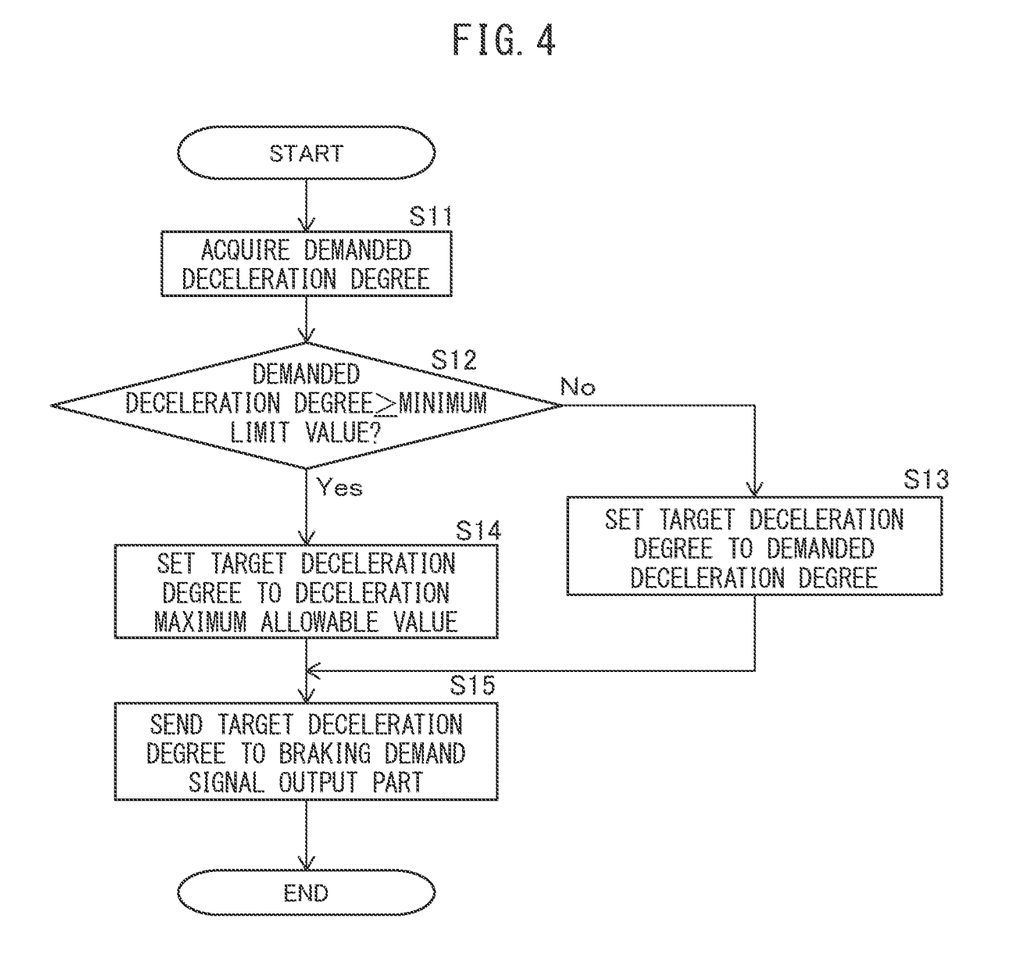
FIG. 4 is a flow chart showing a control routine of processing for setting a target deceleration degree performed by a target deceleration degree setting part of a processor.

FIG. 4 is a flow chart showing a control routine of processing for setting a target deceleration degree performed by the target deceleration degree setting part 532 of the processor 53. The illustrated control routine is performed by the target deceleration degree setting part 532 of the processor 53 every predetermined period, while the vehicle 100 is being controlled for automated driving.

The target deceleration degree setting part 532 first acquires the demanded deceleration degree received from the driving planning part 531 (step S11). Next, the target deceleration degree setting part 532 judges if the acquired demanded deceleration degree is greater than or equal to a deceleration minimum limit value (second reference value) (step S12). Here, the "deceleration minimum limit value" is the smallest value among the target deceleration degrees which had been included in braking demand signals sent to the brake control device 40 in the past and by which the brake control device 40 did not output a corresponding brake control signal (output a failure signal) even if that braking demand signal was sent. Therefore, if a braking demand signal including the deceleration minimum limit value as the target deceleration degree is output from the braking demand signal output part 533 to the brake control device 40, the brake control device 40 does not output the corresponding brake control signal, but outputs a failure signal.

If at step S12 it is judged that the demanded deceleration degree is less than the deceleration minimum limit value, the target deceleration degree setting part 532 sets the target deceleration degree to the demanded deceleration degree received from the driving planning part 531 (step S13). On the other hand, if at step S12 it is judged that the demanded deceleration degree is greater than or equal to the deceleration minimum limit value, that is, if it is judged that the demanded deceleration degree is a value by which a failure signal was output from the brake control device 40 in the past, the target deceleration degree setting part 532 sets the target deceleration degree to a deceleration maximum allowable value (second reference value) smaller than the demanded deceleration degree (step S14).

Here, the "deceleration maximum allowable value" is the greatest value among the target deceleration degrees which had been included in braking demand signals sent to the brake control device 40 in the past and by which the brake control device 40 outputs a corresponding brake control signal if that braking demand signal was sent. Therefore, if a braking demand signal including the deceleration maximum allowable value as the target deceleration degree is output from the braking demand signal output part 533 to the brake control device 40, the brake control device 40 outputs the corresponding brake control signal. Note that, in the present embodiment, the target deceleration degree setting part 532 sets the target deceleration degree to the deceleration maximum allowable value at step S14, but it is also possible to set the target deceleration degree to a value other than the deceleration maximum allowable value as long as the value is a target deceleration degree by which the brake control device 40 outputs a corresponding brake control signal when that braking demand signal was sent, among the target deceleration degrees which had been included in the braking demand signals sent to the brake control device 40 in the past.

If at step S13 or step S14 the target deceleration degree is set, the target deceleration degree setting part 532 sends the set target deceleration degree to the braking demand signal output part 533 (step S15).

Due to the above, in the automated driving control of the vehicle 100, when the demanded deceleration degree (control demand value) to the brakes demanded from the vehicle 100 is smaller than the deceleration minimum limit value (second reference value), the target deceleration degree setting part 532 sets the target deceleration degree (control target value) to this demanded deceleration degree. Further, in the automated driving control of the vehicle 100, when the demanded deceleration degree demanded from the vehicle 100 is greater than or equal to the deceleration minimum limit value (second reference value), the target deceleration degree setting part 532 sets the target deceleration degree to a deceleration maximum allowable value (first reference value) smaller than the deceleration minimum limit value.

Figure 5:
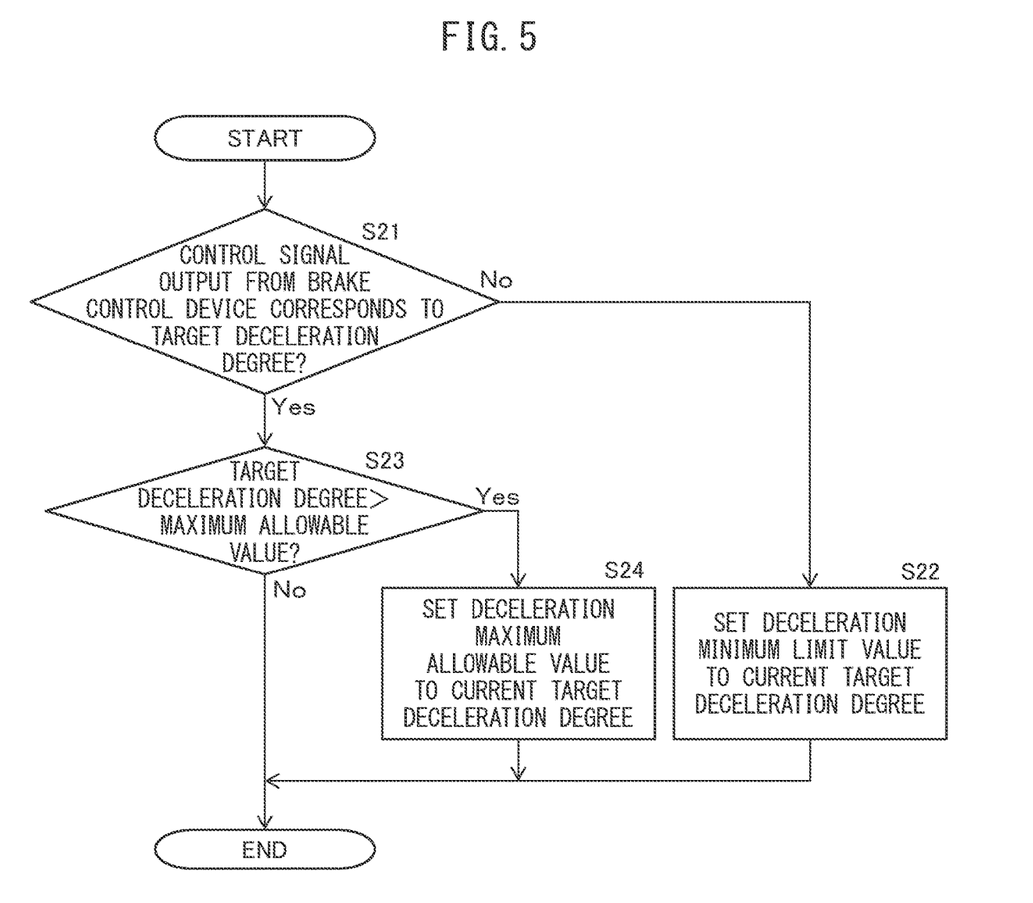
FIG. 5 is a flow chart showing a control routine of processing for updating a deceleration minimum limit value and a deceleration maximum allowable value performed by a target deceleration degree setting part of a processor.

Further, the target deceleration degree setting part 532 updates the deceleration minimum limit value or the deceleration maximum allowable value, based on the output from the brake control device 40 when the braking demand signal including the target deceleration degree set in this way is sent from the braking demand signal output part 533 to the brake control device 40. FIG. 5 is a flow chart showing a control routine of processing for updating the deceleration minimum limit value or the deceleration maximum allowable value performed by the target deceleration degree setting part 532 of the processor 53. The illustrated control routine is performed by the target deceleration degree setting part 532 of the processor 53 every predetermined period, while the vehicle 100 is being controlled for automated driving.

The target deceleration degree setting part 532 first judges if the control signal output from the brake control device 40 corresponds to the target deceleration degree included in the braking demand signal sent to the brake control device 40 (step S21). In the present embodiment, the brake control device 40 outputs the corresponding brake control signal to the brakes, when receiving a braking demand signal including a target deceleration degree less than the upper limit value. Accordingly, the target deceleration degree setting part 532 does not receive a control signal from the brake control device 40. Therefore, in the present embodiment, when not receiving a control signal from the brake control device 40, the target deceleration degree setting part 532 judges that control signal output from the brake control device 40 corresponded to the target deceleration degree. On the other hand, in the present embodiment, when receiving a deceleration degree demand signal including a target deceleration degree greater than or equal to the upper limit value, the brake control device 40 sends a failure signal to the ECU 53, in particular the target deceleration degree setting part 532 of the ECU 53. Therefore, in the present embodiment, when the target deceleration degree setting part 532 receives a failure signal from the brake control device 40, it is judged that the control signal output from the brake control device 40 does not correspond to the target deceleration degree. Note that, when a brake control signal is output from the brake control device 40 to the ECU 50 as well, the target deceleration degree setting part 532 may directly judge if the received brake control signal corresponds to the target deceleration degree.

If at step S21 it is judged that the control signal output from the brake control device 40 does not correspond to the target deceleration degree, the target deceleration degree setting part 532 sets the deceleration minimum limit value to the target deceleration degree which had been included in the current braking demand signal (step S22). Due to this, the deceleration minimum limit value becomes updated to a smaller value by which a failure signal is output from the brake control device 40. Therefore, the deceleration minimum limit value can be said to be the smallest value among the values by which the brake control device 40 did not output a corresponding brake control signal when a braking demand signal including that value as a target deceleration degree in the past was sent from the braking demand signal output part 533 to the brake control device 40.

On the other hand, if at step S21 it is judged that the control signal output from the brake control device 40 corresponds to the target deceleration degree, the target deceleration degree setting part 532 judges whether the target deceleration degree which had been contained in the current braking demand signal is greater than the deceleration maximum allowable value (step S23).

If at step S23 it is judged that the target deceleration degree is less than or equal to the deceleration maximum allowable value, the target deceleration degree setting part 532 does not update the deceleration minimum limit value and deceleration maximum allowable value. On the other hand, if at step S23 it is judged that the target deceleration degree is greater than the deceleration maximum allowable value, the target deceleration degree setting part 532 sets the deceleration maximum allowable value to the braking target value which had been included in the current braking demand signal (step S24). Due to this, the deceleration maximum allowable value becomes updated to a greater value by which a failure signal is not output from the brake control device 40. Therefore, the deceleration maximum allowable value can be said to be the greatest value among the values by which the brake control device 40 output a corresponding brake control signal when a braking demand signal including that value as a target deceleration degree in the past was sent from the braking demand signal output part 533 to the brake control device 40.

The braking demand signal output part 533 receives a braking demand signal from the driver assistance control device 20 through the communication interface 51. Further, the braking demand signal output part 533 is sent a target deceleration degree from the target deceleration degree setting part 532.

While the vehicle 100 is being controlled for automated driving, the braking demand signal output part 533 revises the target deceleration degree included in the braking demand signal received from the driver assistance control device 20 to the target deceleration degree set by the target deceleration degree setting part 532. Further, the braking demand signal output part 533 outputs the revised braking demand signal to the brake control device 40 through the communication interface 51. On the other hand, when the vehicle 100 is not being controlled for automated driving, the braking demand signal output part 533 outputs the braking demand signal received from the driver assistance control device 20 as it is to the brake control device 40.

The target acceleration/deceleration degree setting part 534, in a similar way to the target deceleration degree setting part 532, sets the target acceleration/deceleration degree to be included in the acceleration/deceleration demand signal sent to the accelerator control device 30, while the vehicle 100 is being controlled for automated driving.

In a similar way to the target deceleration degree setting part 532, when a great demanded acceleration degree by which the accelerator control device 30 would output a failure signal is sent from the driving planning part 531, the target acceleration/deceleration degree setting part 534 sets the target acceleration/deceleration degree to a value so that the accelerator control device 30 outputs an accelerator control signal corresponding to this target acceleration/deceleration degree (value such as not to output a failure signal).

Specifically, when the demanded acceleration/deceleration degree (control demand value) to the accelerator demanded from the vehicle 100 is smaller than the acceleration/deceleration minimum limit value (second reference value) in the automated driving control of the vehicle 100, the target acceleration/deceleration degree setting part 534, in a similar way to the target deceleration degree setting part 532, sets the target acceleration/deceleration degree (control target value) to this demanded acceleration/deceleration degree and, when the demanded acceleration/deceleration degree demanded from the vehicle 100 is greater than or equal to the acceleration/deceleration minimum limit value (second reference value) in automated driving control of the vehicle 100, sets the target acceleration/deceleration degree to an acceleration/deceleration degree maximum allowable value (first reference value) smaller than the acceleration/deceleration minimum limit value.

Further, the target acceleration/deceleration degree setting part 534, in a similar way to the target deceleration degree setting part 532, updates the acceleration/deceleration minimum limit value or the acceleration/deceleration maximum allowable value, based on the output from the accelerator control device 30 when the acceleration/deceleration demand signal including the target acceleration/deceleration degree set in this way is sent from the acceleration/deceleration demand signal output part 535 to the accelerator control device 30.

As a result, the acceleration/deceleration minimum limit value is made the smallest value among the values by which the accelerator control device 30 did not output the corresponding accelerator control signal when an acceleration/deceleration demand signal including that value as a target acceleration/deceleration degree was sent from the acceleration/deceleration demand signal output part 535 to the accelerator control device 30 in the past. Further, the acceleration/deceleration maximum allowable value is made the greatest value among the values by which the accelerator control device 30 output the corresponding accelerator control signal when an acceleration/deceleration demand signal including that value as a target acceleration/deceleration degree was sent from the acceleration/deceleration demand signal output part 535 to the accelerator control device 30 in the past.

The acceleration/deceleration demand signal output part 535 receives the acceleration/deceleration demand signal from the driver assistance control device 20 through the communication interface 51. Further, the acceleration/deceleration demand signal output part 535 is sent the target acceleration/deceleration degree from the target acceleration/deceleration degree setting part 534.

The acceleration/deceleration demand signal output part 535 revises the target acceleration/deceleration degree included in the acceleration/deceleration demand signal received from the driver assistance control device 20 to the target acceleration/deceleration degree set by the target acceleration/deceleration degree setting part 534, while the vehicle 100 is being controlled for automated driving. Further, the acceleration/deceleration demand signal output part 535 outputs the revised acceleration/deceleration demand signal to the accelerator control device 30 through the communication interface 51. On the other hand, when the vehicle 100 is not being controlled for automated driving, the acceleration/deceleration demand signal output part 535 outputs the acceleration/deceleration demand signal received from the driver assistance control device 20 to the accelerator control device 30 as is.

ADVANTAGEOUS EFFECTS AND MODIFICATIONS

As explained above, in automated driving control of a vehicle, the control device of a vehicle according to the present embodiment sets a control demand value of equipment demanded from the vehicle as a control target value of equipment when the control demand value is less than or equal to a first reference value, and sets the first reference value as the control target value when the control demand value is greater than or equal to a second reference value greater than the first reference value. For this reason, it becomes difficult for a control demand signal including a control target value not satisfying a predetermined condition to be input to an equipment control device, and accordingly equipment controlled by the equipment control device is kept from becoming unable to be suitably operated and that equipment can be made to suitably operate.

Note that, in the above embodiment, when, in the automated driving control of the vehicle 100, a control demand value demanded from the vehicle 100 is smaller than a second reference value, the control target value setting part sets the control target value to the control demand value and, when the control demand value is greater than or equal to the second reference value, sets the target deceleration degree to the first reference value. However, the control target value setting part may set the control target value to a control demand value demanded from the vehicle 100 in the automated driving control of the vehicle 100 when the control demand value is less than or equal to the first reference value, and may set the target deceleration degree to the first reference value when the control demand value is greater than the second reference value. Therefore, the control target value setting part sets the control target value to a control demand value demanded from the vehicle 100 in the automated driving control of the vehicle 100 when the control demand value is less than or equal to the control demand value, and sets the target deceleration degree to the first reference value when the control demand value is greater than or equal to a second reference value greater than the first reference value.

Further, in the above embodiment, the driver assistance control device 20 generates the braking demand signal and acceleration/deceleration demand signal. However, the driver assistance control device 20 may generate an acceleration/deceleration demand signal and send it to the accelerator control device 30, and the accelerator control device 30 may generate a braking demand signal based on the acceleration/deceleration demand signal and send it to the brake control device. In this case, the accelerator control device 30 controls the accelerator based on the acceleration/deceleration demand signal received from the driver assistance control device 20 or the ECU 50, and the brake control device 40 controls the brakes based on the braking demand signal received from the accelerator control device 30 or the ECU 50.

Furthermore, in the above embodiment, an example where the equipment control devices were the accelerator control device 30 and the brake control device 40 was shown, but the equipment control device may also be a device for controlling other equipment relating to running of the vehicle, for example, a steering control device. In this case, when receiving a steering demand signal including a steering angle change speed of greater than or equal to an upper limit value which the driver assistance control device 20 can output, the steering control device does not output the corresponding steering control signal to the steering equipment, but outputs a failure signal to the ECU 50. Further, the driver assistance control device 20 outputs a steering demand signal including a target steering angle change speed. Furthermore, the driving planning part 531 of the ECU 50 calculates the target steering angle change speed of the steering wheel of the vehicle 100 so that the vehicle 100 runs along the scheduled driving path. Further, the target steering angle change speed setting part (control target value setting part) and steering demand signal output part (demand signal output part) of the ECU 50 output a steering demand signal to the steering control device, based on the steering demand signal input from the driver assistance control device 20 and the target steering angle change speed sent from the driving planning part 531.

Above, preferred embodiments according to the present invention were explained, but the present invention is not limited to these embodiments. Various revisions and changes may be made within the language of the claims.

The invention claimed is:

1. A control device of a vehicle for outputting a control demand signal to an equipment controller that sends an equipment control signal to vehicle equipment for controlling equipment relating to running of the vehicle, the control device of a vehicle comprising a processor,
the processor is configured to:
set a control demand value of equipment demanded from the vehicle in automated driving control of a vehicle as a control target value of equipment when the control demand value is less than or equal to a first reference value, and set the first reference value as the control target value when the control demand value is greater than or equal to a second reference value greater than the first reference value; and
output a control demand signal including the set control target value to the equipment controller through a communication part, wherein
the equipment controller is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, wherein the equipment controller is configured to have an upper limit value, and wherein the equipment controller is further configured to send a failure signal to the processor if the control target value is greater or equal to the upper limit value,
the first reference value is a value wherein the equipment controller outputs a corresponding equipment control signal when the control demand signal including this value as the control target value is sent from the demand signal output part to the equipment controller, and
the second reference value is the smallest value among past values sent to the equipment controller wherein the equipment controller does not output a corresponding equipment control signal and outputs the failure signal when the control demand signal including this value as the control target value is sent from the demand signal output part to the equipment controller.

2. The control device of a vehicle according to claim 1, wherein the first reference value is the greatest value among values wherein the equipment controller outputs a corresponding equipment control signal when the control demand signal including this value as the control target value is sent from the demand signal output part to the equipment controller.

3. The control device of a vehicle according to claim 1, wherein the processor is configured to revise a control target value included in a provisional control demand signal received through the communication part from a driver assistance control device for assisting driving of the vehicle by a driver to the control target value by which the control target value setting part sets, and outputs the control demand signal including the revised control target value to the equipment controller through the communication part.

4. A control method of a vehicle for outputting a control demand signal to an equipment controller that sends an equipment control signal to vehicle equipment device for controlling equipment relating to running of the vehicle, the control method of a vehicle comprising:
setting a control demand value of equipment demanded from the vehicle in automated driving control of a vehicle as a control target value of equipment when the control demand value is less than or equal to a first reference value, and setting the first reference value as the control target value when the control demand value is greater than or equal to a second reference value greater than the first reference value; and outputting a control demand signal including the set control target value to the equipment controller through a communication part, wherein the equipment controller is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, wherein the equipment controller is configured to have an upper limit value, and wherein the equipment controller is further configured to send a failure signal to the processor if the control target value is greater or equal to the upper limit value, the first reference value is a value wherein the equipment controller outputs a corresponding equipment control signal when the control demand signal including this value as the control target value is sent from the demand signal output part to the equipment controller, and the second reference value is the smallest value among past values sent to the equipment controller wherein the equipment controller does not output a corresponding equipment control signal and outputs the failure signal when the control demand signal including this value as the control target value is sent from the demand signal output part to the equipment controller.

5. A non-transitory computer readable medium having recorded thereon a computer program of a vehicle for causing output of a control demand signal to an equipment controller that sends an equipment control signal to vehicle equipment for controlling equipment relating to running of the vehicle, the computer program causing a computer to execute a process comprising:

setting a control demand value of equipment demanded from the vehicle in automated driving control of a vehicle as a control target value of equipment when the control demand value is less than or equal to a first reference value and set the first reference value as the control target value when the control demand value is greater than or equal to a second reference value greater than the first reference value; and outputting a control demand signal including the set control target value to the equipment controller through a communication part, wherein the equipment controller is configured to output an equipment control signal corresponding to the control target value if receiving the control demand signal including a control target value satisfying a predetermined condition and to output an equipment control signal not corresponding to the control target value if receiving the control demand signal including a control target value not satisfying the predetermined condition, wherein the equipment controller is configured to have an upper limit value, and wherein the equipment controller is further configured to send a failure signal to the processor if the control target value is greater or equal to the upper limit value, the first reference value is a value wherein the equipment controller outputs a corresponding equipment control signal when the control demand signal including this value as the control target value is sent from the demand signal output part to the equipment controller, and the second reference value is the smallest value among past values sent to the equipment controller wherein the equipment controller does not output a corresponding equipment control signal and outputs the failure signal when the control demand signal including this value as the control target value is sent from the demand signal output part to the equipment controller.

\* \* \* \* \*